(12) United States Patent
Kim et al.

(10) Patent No.: US 7,349,307 B2
(45) Date of Patent: Mar. 25, 2008

(54) METHOD OF RECORDING DATA OPTIMALLY ONTO A RECORDING MEDIUM

(75) Inventors: Joung Woo Kim, Kyunggi-do (KR); Cheul Kyung Han, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 640 days.

(21) Appl. No.: 10/452,589

(22) Filed: Jun. 3, 2003

(65) Prior Publication Data

US 2004/0001407 A1   Jan. 1, 2004

(30) Foreign Application Priority Data

Jun. 29, 2002   (KR) ...................... 10-2002-0037678
Nov. 19, 2002   (KR) ...................... 10-2002-0071939

(51) Int. Cl.
*G11B 7/00* (2006.01)
(52) U.S. Cl. ................. 369/47.53; 369/116; 369/53.22
(58) Field of Classification Search ..................... None
See application file for complete search history.

(56) References Cited

U.S. PATENT DOCUMENTS 7,046,600 B2 *   5/2006   Matsumoto .............. 369/47.53
2001/0004344 A1 *   6/2001   Roh ......................... 369/53.22
2002/0031060 A1 *   3/2002   Mashimo et al. ......... 369/47.51
2002/0044507 A1 *   4/2002   Hagiwara et al. ........ 369/47.53
2003/0043711 A1 *   3/2003   Mashimo et al. ........... 369/116
2003/0072235 A1 *   4/2003   Naoi et al. ................ 369/53.18

FOREIGN PATENT DOCUMENTS

| JP | 10106009 A | * | 4/1998 |
| JP | 2001-331940 | | 11/2001 |
| KR | 2002-0052811 A | | 7/2002 |

* cited by examiner

*Primary Examiner*—William Korzuch
*Assistant Examiner*—Jorge L. Ortiz-Criado
(74) *Attorney, Agent, or Firm*—Birch, Stewart, Kolasch & Birch, LLP

(57) ABSTRACT

The present invention relates to a method of maintaining an optimal writing power for various recording modes during data recording onto a recording medium. The present method checks a recording speed at a recording position, reads a write strategy set for the checked recording speed, detects a reflected level while recording data with the read write strategy, and changes a level reference for ROPC according to the detected level. Accordingly, a writing power can be kept most optimal even though a recording speed changes during data recording, thereby improving the quality of reproduced signals.

19 Claims, 4 Drawing Sheets

Background Art

METHOD OF RECORDING DATA OPTIMALLY ONTO A RECORDING MEDIUM

This nonprovisional application claims priority under 35 U.S.C. §119(a) on Patent Application Nos. 02-37678 filed in Korea on Jun. 29, 2002, and 02-71939 filed in Korea on Nov. 19, 2002, which are herein incorporated by reference.

BACKGROUND OF THE INVENTION

1. Field of the Invention

The present invention relates to an optimal-writing method, medium and apparatus and more particularly, for maintaining an optimal writing power for various recording modes during data recording onto a recording medium.

2. Description of the Background Art

A disk device being capable of recording data onto a disk recording medium always conducts an OPC (Optimal Power Calibration) at a PCA (Power Calibration Area) to determine an optimal writing power before writing input data onto a disk recording medium. The determined optimal writing power is used to write user data inputted from an external source onto a disk recording medium.

During data recording, a recording position advances outward. However, the characteristics of a recording layer changes from inner radius to outer radius. Therefore, although data is recorded with the obtained optimal writing power, the quality of a reproduced signal may not be preserved at the outer radius.

Due to the centrifugal force in the spin coating process, the thickness of the created recording layer tends to increase from the inner radius to outer radius.

Unless the thickness of the recording layer is uniform over the disk, the response of the recording layer to an applied writing laser beam differs according to the thickness. As the thickness of the recording layer increases, the extent to which the recording layer is burnt by the writing beam decreases and thus the reflection ratio of burnt marks increases. As a result, characteristic of reproduced signals deteriorate as the position moves outward.

To overcome such a problem, a disk device detects a reflected level (called 'B-level') as a reference when a writing pulse has been stabilized after a medium change, and controls the writing power adaptively to make the B-level detected during data recording equal to the previously-detected reference (See FIG. 1). This operation is called ROPC (Running Optimal Power Control).

A disk device may data on a disk recording medium at low enough a speed such that a medium characteristic is fully changed by a writing pulse. The recording mode so used is called 'CLV' (Constant Linear Velocity) shown in FIG. 2a. The recording speed is same at all positions on a recording medium in CLV mode.

However, technology development has introduced a P-CAV (Partial Constant Angular Velocity) recording mode in which recording speed increases gradually up to a maximum recording speed as a recording position moves outward and a recording mode is changed to CLV the moment recording speed reaches the maximum, as shown in FIG. 2b. Due to the P-CAV mode, the overall recording speed is increased.

Recording technology has made higher recording speeds possible by full CAV in which recording is conducted under constant rotational speed on an entire recording area as shown in FIG. 2c. If a user requests the fastest recording speed, user data are recorded in full CAV.

However, if a recording speed changes (during data recording), from the speed at which B-level reference was detected, the ROPC can not ensure an optimal writing power. Therefore, it is necessary for a disk recording device to adapt ROPC to various recording modes and to improve ROPC to cope with changes in recording speed.

SUMMARY OF THE INVENTION

It is an object of the present invention to provide a method and apparatus for selecting an adequate ROPC for a given recording mode.

It is another object of the present invention to provide a method of keeping a writing power optimal even though recording speed changes.

A method for writing data optimally onto a recording medium in accordance with the present invention is characterized in that it checks a recording mode at a recording position, and determines (based on the checked recording mode) whether or not to update a reference of a reflected level for ROPC during data recording.

Another method for writing data optimally onto a recording medium in accordance with the present invention is characterized in that it checks a recording speed at a recording position, reads a write strategy set for the checked recording speed, detects a reflected level while recording data with the read write strategy, and changes a level reference for ROPC with the detected level.

BRIEF DESCRIPTION OF THE DRAWINGS

The accompanying drawings, which are included to provide a further understanding of the present invention, illustrate preferred embodiments of the invention, and together with the description, serve to explain the principles of the present invention, and wherein.

DETAILED DESCRIPTION OF PREFERRED EMBODIMENTS

In order that the present invention may be fully understood, a preferred embodiment thereof will now be described with reference to the accompanying drawings.

Figure 1:
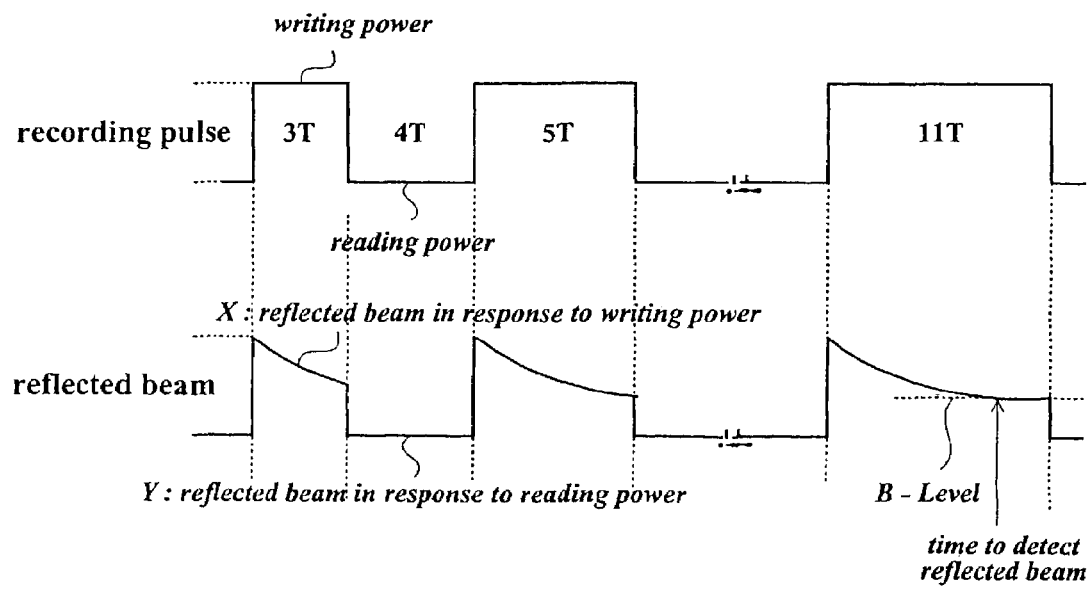
FIG. 1 shows a reflected level waveform by respective writing pulses.
Figure 2A:
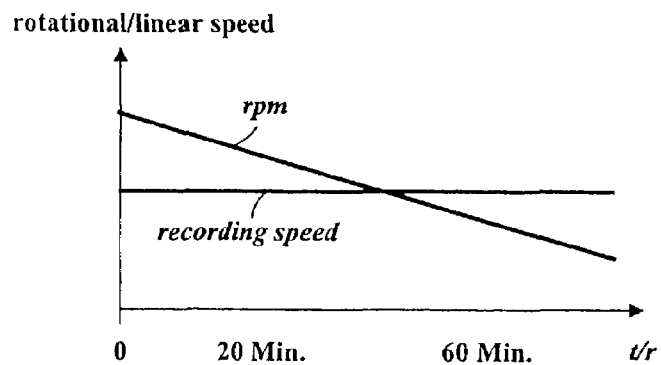
FIGS. 2a to 2c show three recording modes for recording data onto a writable recording medium.
Figure 2B:
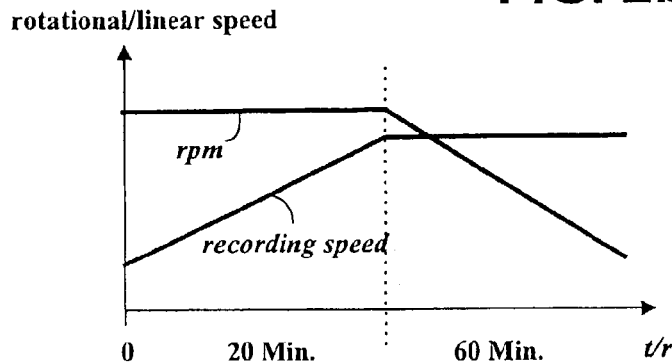
Figure 2C:
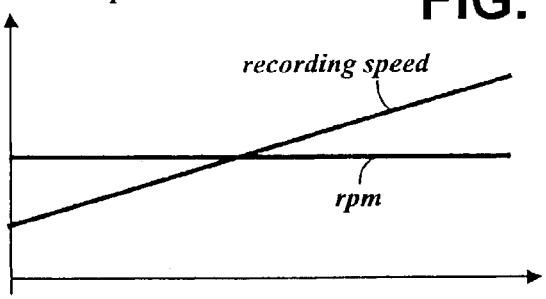
Figure 3:
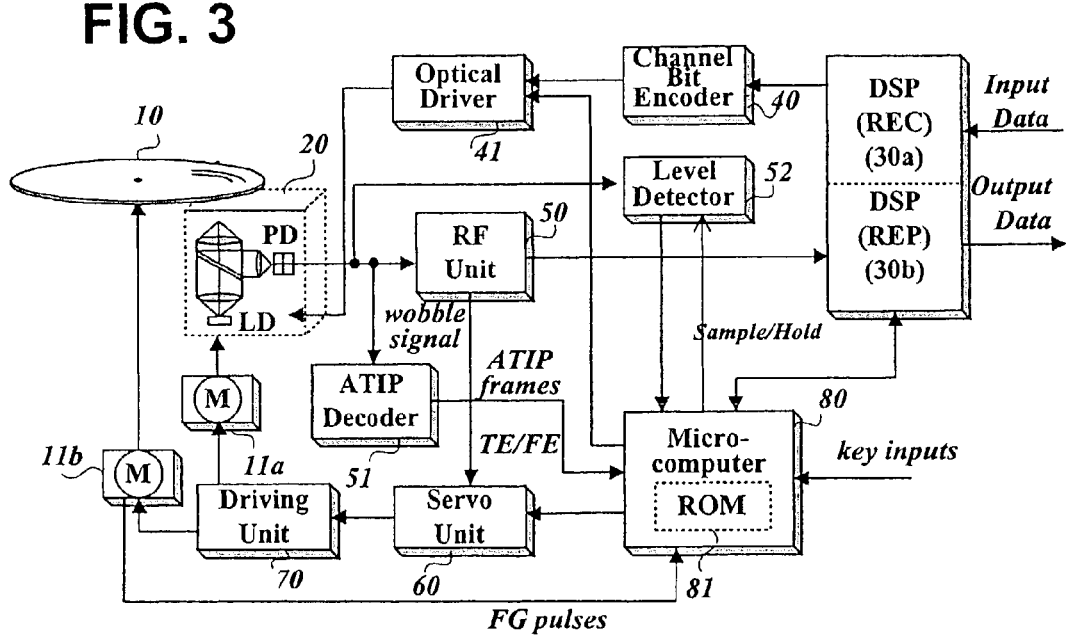
FIG. 3 is a block diagram of a disk device in which a method of writing optimally onto a recording medium in accordance with the present invention is embedded.

FIG. 3 is a block diagram of a disk device in which a method of writing optimally onto a recording medium in accordance with the present invention is embedded.

The disk device of FIG. 3 comprises a recording signal processing unit 30a for converting input digital data into recording-formatted data after adding an error correction code (ECC), a channel bit encoder 40 for reconverting the recording-formatted data into a bit stream, an optical driver 41 for outputting an optical drive signal in response to an input signal, an optical pickup 20 for recording the input bit stream on a recording medium 10 using the optical drive signal and for reading recorded data from the recording medium 10, an R/F unit 50 for producing a binary signal and TE/FE (Tracking Error/Focusing Error) signals by selectively combining the signals reproduced by the optical pickup 20, an ATIP (Absolute Time in Pregroove) decoder 51 detecting a wobble signal of low frequency from a reflected signal outputted from the pickup 20 and producing ATIP frames by decoding the detected wobble signal, a level detector 52 detecting a reflected level from a mark or space formed on the medium 10, a drive unit 70 for driving a sled motor 11a to move the optical pickup 20 and a spindle motor 11b to rotate the recording medium 10, a servo unit 60 for conducting a tracking/focusing servo operation for an objective lens in the pickup 20 and controlling the drive unit 70 to rotate the recording medium 10 a at constant speed, a reproduced signal processing unit 30b for retrieving original data from the binary data using its synchronized clock with the binary signal, and a microcomputer 80 for controlling all the elements overall to conduct data recording/reproducing, and particularly to conduct the best ROPC for a given recording condition.

Figure 4:
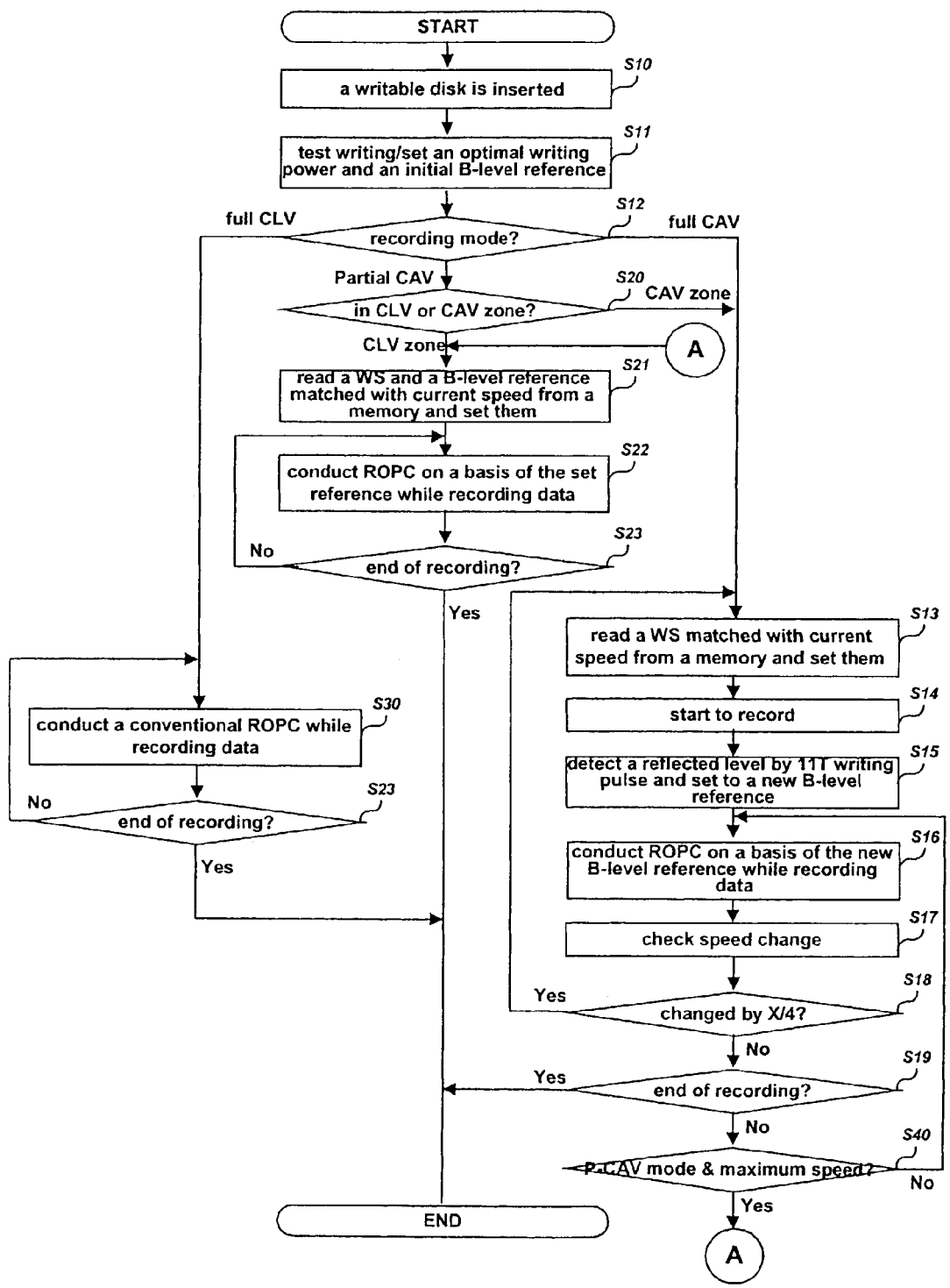
FIG. 4 is a flow diagram of an embodiment of an optimally writing method of the present invention.

FIG. 4 is a flow diagram of an embodiment of an optimal writing method of the present invention. The embodiment of FIG. 4 conducted by the disk device of FIG. 3 is described in detail.

When a writable disk 10 is normally placed onto a tray (not shown) in the disk device (S10) it is rotated under control of the microcomputer 80. Afterwards, the microcomputer 80 analyzes ATIP frames outputted from the ATIP decoder 51 to search frames decoded from a lead-in area for the first (Frame No. N) and the 11-th (Frame No. N+10) frame, namely, the first and the second special information. Each ATIP frame is composed of three bytes called 'Minutes', 'Seconds' and 'Frames'. Respective MSBs of three bytes of the two frames are '101' and '110', respectively. The first frame includes information on a writing power reference and a disk type while the 11-th frame includes information on a start time of a lead-in area.

If the two frames are found, the microcomputer 80 knows a writing power reference from M2:M3:M4 in the first frame, and reads three bytes of the 11-th frame after replacing three bits of M1:S1:F1 with '100' for the 11-th frame.

The start time written in the three bytes of the 11-th frame has a different value from one manufacturing company to another. Therefore, the microcomputer 80 can identify which company has manufactured the inserted disk 10 based on the read-out start time. The 21st frame (Frame No. N+20), namely the third special information containing information on start time of a lead-out area can be used to identify a disk category (or manufacturing company).

The microcomputer 80 selects a WS (Write Strategy), stored in an internal ROM 81, that is matched with the identified disk category and the current speed, and sets the optical driver 41 according to the selected WS. The current speed may be set manually by an externally generated request.

The microcomputer 80 controls the optical driver 41 to change writing power step by step on a basis of the known writing power reference while test data are being recorded onto PCA of the writable disk 10. After completion of a writing test, the microcomputer 80 determines an actual optimal writing power through examining characteristics of reproduced test signals from the PCA. During this OPC, the microcomputer 80 sets a B-level detected from an 11T writing pulse to an initial reference (S11).

Afterwards, the microcomputer 80 checks which recording mode is set (S12). The recording mode can be set by a command from an external host or by a manual request of a user. For instance, if maximum recording speed is requested from a user, P-CAV or full CAV mode is set, and if stable recording is requested, CLV mode is set.

If the checked mode was CLV, the microcomputer 80 would conduct a conventional OPC on a basis of the initial B-level reference while data are being recorded (S30).

If P-CAV, the microcomputer 80 searches for a target location for input data and determines whether the target location is within a CAV or CLV zone (S20). The target location can be known from track information written in the PMA (Program Memory Area) of the writable disk 10 or can be pointed to by an address (or time code) received from an external host.

The determination of whether the target location is within a CLV or CAV zone can be easily known from a period of ATIP frames or sync signals of ATIP frames outputted from the ATIP decoder 51 after the pickup 20 moves to the target location. If speed corresponding to the period is below the maximum speed, e.g., below 40X ('X' represents a basic speed) allowable in P-CAV mode, it is determined to be in a CAV zone, otherwise, it is determined to be in a CLV zone.

In the latter case, the microcomputer 80 disregards the initially-obtained B-level reference and reads a B-level reference (S21), stored in the memory 81, that is matched with the previously-identified disk category and the speed at the current location, and uses the read B-level reference in conducting ROPC during a later recording operation (S22).

If it is determined to be in a CAV zone or the checked mode at the step S12 is full CAV, the microcomputer 80 reads out new WS, stored in the memory 81, that is matched with the identified disk category and the current speed, e.g., 24X and sets the optical driver 41 again according to the new WS (S13). Input data are then written under the newly set condition onto the disk 10 (S14). The recording speed at the target location may be designated by an external command to any speed below allowable maximum speed at that location.

The moment the microcomputer 80 starts to record input data it commands the level detector 52 to detect a stabilized reflected signal by an 11T writing pulse. The detected level by the level detector 52 is set to a new B-level reference (S15) and the microcomputer 80 conducts ROPC on a basis of the new B-level reference (S16).

While the input data are being recorded, the microcomputer 80 keeps checking for a change in speed (S17).

If the speed change is X/4, for example, if the present speed is 24.25X on the assumption that the speed at which the B-level reference was obtained is 24X, the microcomputer 80 reads out new WS, stored in the memory 81, that is matched with the previously-identified disk category and the current speed, namely, 24.25X and sets the optical driver 41 again according to the new WS (S18). Then, input data writing to the disk 10 is resumed under the newly set condition (S14) and, at the same time, a reflected level by an 11T writing pulse is detected again. The microcomputer 80 sets the detected level to a new B-level reference (S15) and conducts ROPC with the newly-set B-level reference.

The above-explained operation of B-level reference updating every X/4 speed change continues until completion of data recording (S19).

The above embodiment uses a B-level detected at a point at which a speed is changed as a reference for an area coming next to the speed changed point. As another embodiment, a B-level is continuously detected until a recording speed change reaches X/4, and its average is set to a new B-level reference of ROPC for the next area following the X/4-speed changed point.

If the recording mode is P-CAV and the recording speed increased as above has reached the maximum speed, e.g., 40X (S40), the microcomputer 80 reads out a WS and a B-level reference (S21), stored in the memory 81, that are matched with the previously-identified disk category and that speed, and sets the optical driver 41 according to the new WS and conducts ROPC with the read B-level reference (S22).

Figure 5:
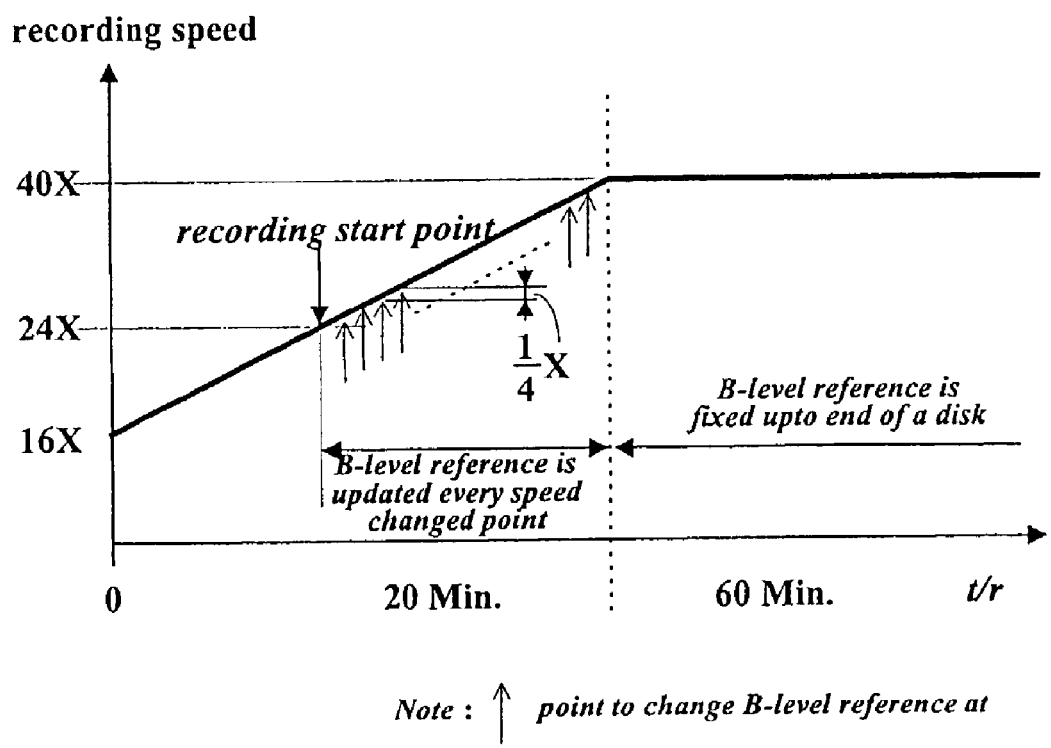
FIG. 5 illustrates a B-level reference updating process schematically in case that the present method is conducted for partial CAV mode.

FIG. 5 illustrates a B-level reference updating process schematically in case that the above-explained method is conducted for P-CAV mode. If the mode is full CAV, the B-level reference continues to be updated up to the outermost track of the writable disk 10.

The above-explained optimal writing method can conduct an ROPC most suitable to a given recording mode in case that various recording modes are applicable, and can keep a write strategy and writing power most suitable and most optimal although a recording speed changes during data recording, thereby improving the quality of reproduced signals.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for writing data optimally onto a recording medium, comprising the steps of:
    (a) checking a recording mode at a recording position;
    (b) determining whether or not to update a reference of a reflected level for Running Optimal Power Control (ROPC) during data recording based on the checked recording mode; and
    (c) writing data, if a recording speed changes by a predetermined step, under a writing condition suitable to the changed speed, detecting a reflected level by a writing pulse produced from the writing condition, and using the reflected level as a new level reference of the ROPC for the changed speed.

2. The method of claim 1, wherein the recording mode is determined based on a recording speed requested from an external source.

3. The method of claim 1, wherein said step (b) determines not to update the reference of a reflected level if the checked mode is a constant-linear-velocity mode, and determines to update if it is a constant-angular-velocity mode.

4. The method of claim 1, wherein said step (b) determines to update a reference of a reflected level if the checked mode indicates that a recording speed changes during data recording.

5. The method of claim 4, further comprising the step of (d) repeating the process to detect a reflected level by a writing pulse during data recording, and using an average of the detected levels as a new level reference of ROPC for a speed changed by a predetermined step.

6. The method of claim 1, further comprising the step of (d) conducting ROPC on a basis of a reference of a reflected level that is preset for a recording speed at the recording position.

7. The method of claim 6, wherein the preset reference differs from one disk manufacturing company to another.

8. A method for writing data optimally onto a recording medium, comprising the steps of:
    (a) checking a recording mode corresponding to a recording speed chosen by a user;
    (b) determining whether or not to update a reference of a reflected level for ROPC during data recording based on the checked recording mode; and
    (c) writing data, if a recording speed changes by a predetermined step, under a writing condition suitable to the changed speed, detecting a reflected level by a writing pulse produced from the writing condition, and using the reflected level as a new level reference of the ROPC for the changed speed.

9. A method for writing data optimally onto a recording medium, comprising the steps of:
    (a) checking a recording speed at a recording position;
    (b) reading a write strategy set for the checked recording speed; and
    (c) detecting a reflected level while recording data with the read write strategy, and changing a level reference for ROPC with the detected level,
    wherein said steps (b) and (c) are conducted whenever the recording speed changes by a predetermined step.

10. The method of claim 9, further comprising the step of (d) conducting ROPC on a basis of the changed level reference.

11. The method of claim 9, wherein the recording speed differs as the recording position moves.

12. The method of claim 9, further comprising the step of (d) conducting, if the recording speed reaches a certain speed, data recording at that certain speed up to an outermost track of the recording medium.

13. An apparatus for writing data optimally onto a recording medium, including:
    a microcomputer for checking a recording mode;
    determining whether or not to update a reference of a reflected level for ROPC during data recording based on the checked recording mode; and
    a writing beam source for writing data, if a recording speed changes by a predetermined step, under a writing condition suitable to the changed speed;
    a level detector for detecting a reflected level by a writing pulse produced from the writing condition, wherein the reflected level is used as a new level reference of ROPC for the changed speed.

14. The apparatus as claimed in claim 13, wherein said microcomputer determines not to update a reference of a reflected level if the checked mode is constant-linear-velocity mode, and determines to update a reference of a reflected level if the checked mode is constant-angular-velocity mode.

15. The apparatus as claimed in claim 13, wherein the microcomputer determines to update a reference of a reflected level if the checked mode indicates that recording speed changes during data recording.

16. The apparatus as claimed in 15, wherein said microcomputer directs a level detector to repeat a process of detecting a reflected level by a writing pulse during data recording, and using an average of the detected levels as a new level reference of ROPC for a speed changed by a predetermined step.

17. The apparatus of claim 13, wherein said microcomputer checks a recording mode at a recording position.

18. The apparatus of claim 17, wherein said microcomputer conducts ROPC on a basis of a reference of a reflected level that is preset for a recording speed at said recording position.

19. The apparatus of claim 13, wherein said microcomputer checks a recording mode corresponding to a recording speed selected by a user.

* * * * *